(12) United States Patent
Warner

(10) Patent No.: US 11,082,464 B1
(45) Date of Patent: Aug. 3, 2021

(54) DISPLAYING ADDITIONAL EXTERNAL VIDEO CONTENT ALONG WITH USERS PARTICIPATING IN A VIDEO EXCHANGE SESSION

(71) Applicant: Facebook, Inc., Menlo Park, CA (US)

(72) Inventor: Kathleen Warner, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 17/118,289

(22) Filed: Dec. 10, 2020

(51) Int. Cl.
*H04L 29/06* (2006.01)
*H04N 21/485* (2011.01)

(52) U.S. Cl.
CPC ........ *H04L 65/403* (2013.01); *H04L 65/4015* (2013.01); *H04L 65/601* (2013.01); *H04N 21/4858* (2013.01)

(58) Field of Classification Search
CPC . H04L 65/4015; H04L 65/403; H04L 65/601; H04L 65/608; H04L 43/045; H04L 63/104; H04N 21/4858; H04N 21/4398; H04N 21/4622; H04N 21/835; H04N 5/2628; G06F 16/40; G06F 3/04817; G06Q 20/384; H04W 4/023; H04W 84/12
See application file for complete search history.

(56) References Cited

U.S. PATENT DOCUMENTS

| | | | | |
|---|---|---|---|---|
| RE46,865 E | * | 5/2018 | Schifone | G06F 16/40 |
| 2011/0078721 A1 | * | 3/2011 | Wang | H04N 21/835 |
| | | | | 725/25 |
| 2011/0164182 A1 | * | 7/2011 | Wada | H04N 21/4398 |
| | | | | 348/554 |
| 2013/0013688 A1 | * | 1/2013 | Wang | H04L 63/104 |
| | | | | 709/204 |
| 2013/0081083 A1 | * | 3/2013 | Yu | H04N 21/4622 |
| | | | | 725/40 |
| 2015/0356587 A1 | * | 12/2015 | Mokwunye | G06Q 20/384 |
| | | | | 705/14.16 |
| 2019/0141089 A1 | * | 5/2019 | Loheide | H04L 65/608 |
| 2019/0251782 A1 | * | 8/2019 | Venolia | H04W 4/023 |
| 2020/0042166 A1 | * | 2/2020 | Burns | H04N 5/2628 |
| 2020/0401464 A1 | * | 12/2020 | Studnicka | G06F 3/04817 |
| 2021/0014139 A1 | * | 1/2021 | Comerica | H04L 43/045 |
| 2021/0068203 A1 | * | 3/2021 | Katrib | H04W 84/12 |

* cited by examiner

*Primary Examiner* — Le H Luu
(74) *Attorney, Agent, or Firm* — Fenwick & West LLP

(57) ABSTRACT

When an online system creates a video exchange session, a user participating in the video exchange session requests inclusion of external video data from an external source other than users participating in the video exchange session. The online system displays the external video content received from the external source in an interface in conjunction with video content received from the users participating in the video exchange session. Displaying the external video content in conjunction with video content from users participating in the video exchange session allows the online system to provide the users with a distraction while in the video exchange session. The online system may associate different external sources with different activities for the video exchange session, allowing selection of an activity to determine the displayed external video content.

20 Claims, 4 Drawing Sheets

DISPLAYING ADDITIONAL EXTERNAL VIDEO CONTENT ALONG WITH USERS PARTICIPATING IN A VIDEO EXCHANGE SESSION

BACKGROUND

This disclosure relates generally to exchange of video content between users of an online system, and more specifically to generating an interface that displays video content from users in conjunction video content from a source other than the users.

Users of online systems increasingly communicate by exchanging video content captured by their respective client devices. For example, a user of an online system establishes a video exchange session with one or more other users of the online system. During the video exchange session, the online system displays an interface to users participating in the video exchange session. The interface displayed to a user displays video content received from other users participating in the video exchange session in different portions of the interface, allowing a user viewing the interface to see video content from client devices of other users. For example, the interface displays video content captured by client devices of users participating in the video exchange session, allowing users participating in the video exchange session to synchronously exchange video content captured by their respective client devices.

Conventional online systems allow a user to request establishment of a video exchange session by providing an invitation to join the video exchange session to other users invited to participate in the video exchange session. By accepting the invitations, the other users exchange video content with the requesting user through the video exchange session. While video exchange sessions established by conventional online systems allow users to exchange video data, interfaces for exchanging video data provide limited additional content to users. For example, a conventional video exchange interface displays video content received from different users but does not display additional content to provide relief or distraction from the exchanged video content. This lack of content other than the shared video content may reduce a frequency with which users exchange video data through an online system.

SUMMARY

An online system receives a creation request from a requesting user for a video exchange session to exchange video content where the requesting users and one or more other users exchange video content captured by their respective client devices. In various embodiments, the creation request identifies one or more other users to whom the online system transmits invitations to join the video exchange session. For example, the creation request includes user identifiers of specific users provided by the requesting user, so the online system transmits invitations to the specific users. As another example, the creation request includes a specific characteristic of users, so the online system transmits an invitation to join the video exchange session to users having the specific characteristic.

The online system transmits invitations to join the video exchange sessions to users identified by the creation request from the requesting user. In various embodiments, an invitation to join the video exchange session includes thematic information from the activity specified for the video exchange session. The invitation includes information identifying the video exchange session, and a link that, when accessed by a user via a client device, causes the client device of the user to join the video exchange session. For example, the requesting user specifies a name of the video exchange session in the creation request to the online system, and the invitation transmitted from the online system to one or more other users identified by the creation request includes the name of the video exchange session. The invitations transmitted from the online system to the one or more other users may include other information, such as a description of the video exchange session or information identifying the requesting user.

In response to receiving acceptances of invitations from one or more users, the online system establishes the video exchange session between the requesting user and the one or more users from whom acceptances of invitations were received. Additionally, the online system receives a request to include external video content in the video exchange session. The external video content is obtained from an external source other than the users who are participating in the video exchange session. In various embodiments, the online system receives the request to include external video content in the video exchange session from a user who joined the video exchange session. Hence, the request to include external video data in the video exchange session may be received from the requesting user before the video exchange session is established or before the invitations to join the video exchange session are transmitted from the online system, in some embodiments. Alternatively, the online system receives the request to include external video data in the video exchange session after the online system establishes the video exchange session.

The external video content is obtained from an external source that is different from the users participating in the video exchange session. For example, the external video content is obtained from content stored by the online system. As another example, the external video content is obtained from a third party system. In another example, the external video content is obtained from an alternative user of the online system who is not participating in the video exchange session. The external video content may be stored video content, such as video content that displays in a loop. Alternatively, the external video content is streaming video content obtained from a third party system or from the online system.

In some embodiments, thematic content identified by an activity for the video exchange session may identify external video content that is displayed along with video content from users participating in the video exchange session. In various embodiments, different activities specify different external sources of external video content. For example, an activity relating to sports may specify external sources including highlights of completed sporting events, including analysis of sporting events, or including video content streaming current sporting events. As another example, an activity relating to nature may specify external sources including stored video content of animals or including streaming video content of animal habitats. In various embodiments, an activity is associated with one or more external sources of external video content, and the request for external video content is a selection of an activity. Alternatively, the received request includes identifiers of external sources for external video content, allowing the user from whom the request was received to specify the external sources for the external video content.

The online system generates the interface for the video exchange session associating each user participating in the video exchange with a region in the interface and allocating one or more regions in the interface as external regions in which external video is displayed. Hence, the interface inserts video content the online system receives from a user participating in the video exchange session into a region associated with the user and inserts external video content obtained from a source other than users participating in the video exchange session into the one or more external regions. This allows the interface to display video content obtained from users participating in the video exchange session along with external video data obtained from one or more sources other than the users participating in the video exchange session, so the external video data provides a common distraction or common alternative content displayed to each of the users participating in the video exchange session.

In some embodiments, a location of an external region within the interface is specified by a template corresponding to an activity specified by the request to include external video content in the video exchange session. For example, the template specifies specific locations (e.g., locations at boundaries of the interface, locations in corners of the interface, etc.) in which external regions are located, so external video content is displayed in specific locations within the interface. Different templates may be associated with different activities, so external content is displayed in different locations within the interface when different activities are specified for the video exchange session. Alternatively, the user from whom the request to include external video content in the video exchange session selects locations within the interface where external video content is displayed when the interface is generated or in the request to include external video content in the video exchange session. The interface may include multiple external regions in some embodiments. Different external sources may be allocated to different external regions, allowing the interface to display external video from multiple external sources in different external regions. Alternatively, external video content from a common external source is displayed in multiple external regions.

The online system transmits the generated interface to client devices of users participating in the video exchange session, with the client devices displaying the interface so video content from each user participating in the video exchange session is shown in a region corresponding to the user and the external video content is displayed in the external region of the interface allocated to the external video content. In some embodiments, the interface displays video content received from a user to whom the interface is displayed in the interface, while in other embodiments, the interface does not display video content received from the user to whom the interface is displayed via the user's client device. Thus, the interface transmitted to client devices of users includes the external video content from the external source other than the users participating in the video exchange session displayed in conjunction with video content received from the users participating in the video exchange session.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
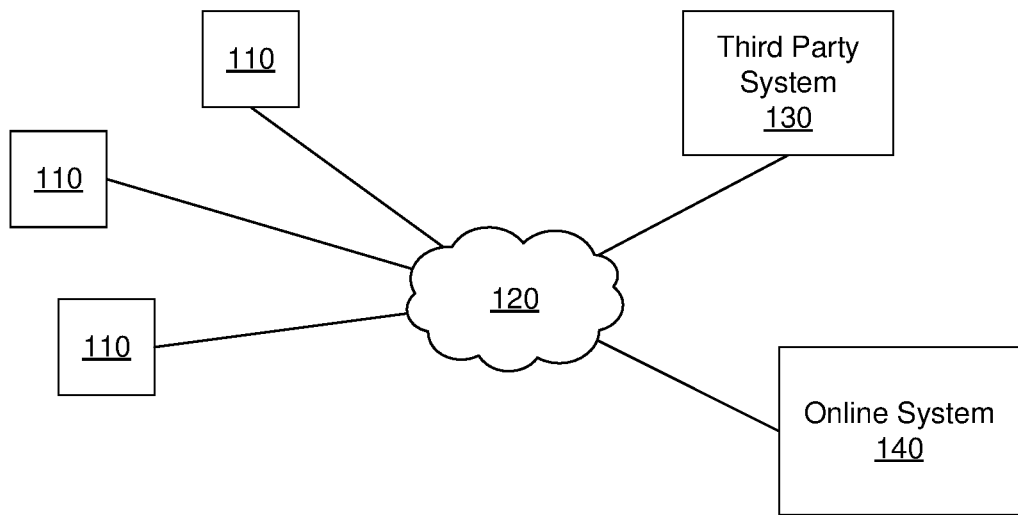
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
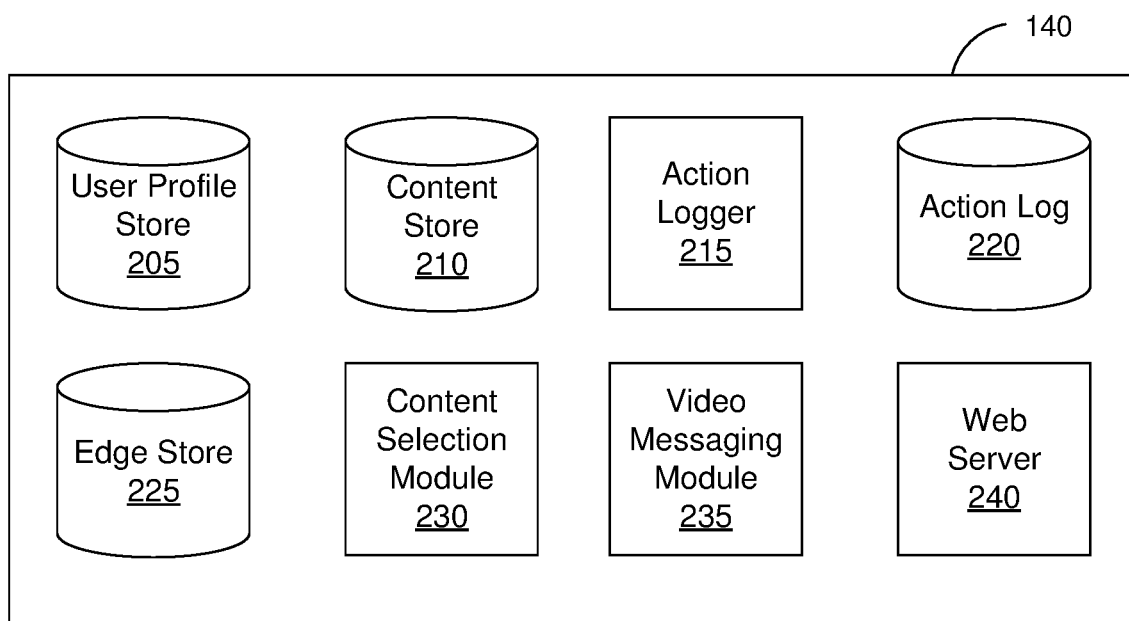
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, a video messaging module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The video messaging module 235 allows users of the online system 140 to exchange video content captured by client devices 110 corresponding to each of the users. In various embodiments, the video messaging module 235 receives a creation request from a requesting user for a video exchange session to exchange video content with other users that identifies one or more other users. The video messaging module 235 transmits an invitation to join a video exchange session to the identified one or more other users. The invitation includes information identifying the video exchange session, and a link that, when accessed by a user via a client device 110, causes the client device 110 of the user to join the video exchange session. For example, the requesting user specifies a name of the video exchange session in the creation request to the video messaging module 235, and the invitation transmitted from the video messaging module 235 to one or more other users identified by the creation request includes the name of the video exchange session. The invitation transmitted from the video messaging module 235 to the one or more other users may include other information, such as a description of the video exchange session or information identifying the requesting user.

In various embodiments, the requesting user specifies an activity for the video exchange session in the creation request. The activity identifies thematic content of the video exchange session. Example thematic content for the video exchange session include a name for the video exchange session, backgrounds from which video content received from a user participating in the video exchange session (e.g., video content captured by a user's client device 110) may be overlaid, one or more effects that users participating in the video exchange session may include in video content from the users, or other content for display or presentation to users participating in the video exchange session.

Figure 3A:
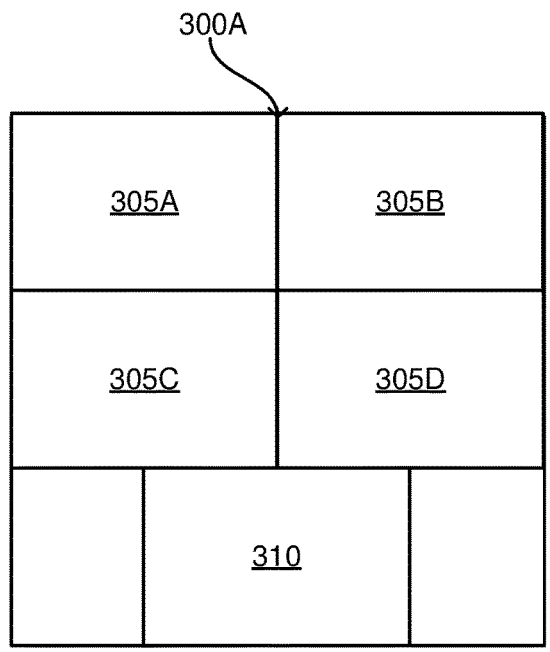
FIGS. 3A and 3B are example interfaces displayed to users who have joined a video exchange session, in accordance with an embodiment.
Figure 3B:
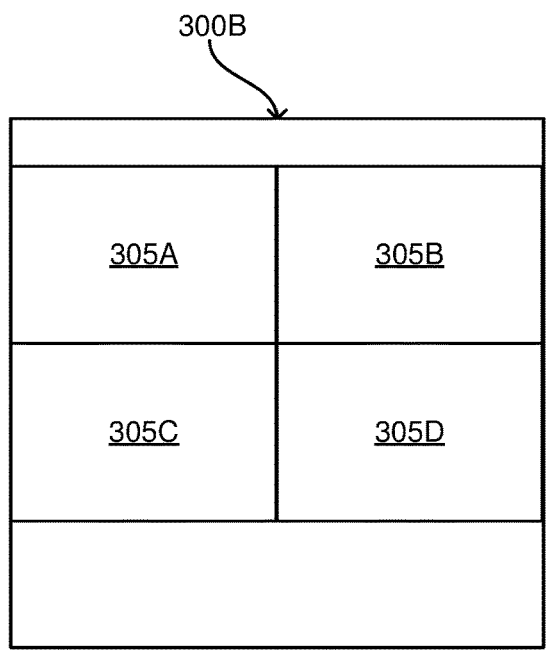

When the requesting user and at least one other user join the video exchange session, the video messaging module 235 generates an interface that is displayed to the requesting user and to other users who have joined the video exchange session. In various embodiments, the video messaging module 235 partitions the interface into regions, with each region corresponding to a user who has joined the video exchange session. The video messaging module 235 receives video content from a client device 110 of a user who has joined the video exchange session and displays the received video in a region of the interface corresponding to the user who has joined the video exchange session. The interface is transmitted to client devices 110 of users who have joined the video exchange session. Hence, the interface transmitted to a client device 110 of a user who has joined the video exchange session includes regions displaying video content from client devices 110 of other users who have joined the video exchange session, allowing for synchronous, or near-synchronous, exchange of video content between the users who have joined the video exchange session. In some embodiments, the interface includes a region showing video content from a user 110 who is viewing the interface, allowing the user to see the video from the user via the interface along with video content from other users who have joined the video exchange session. Alternatively, the interface does not include a region showing video content from the user who is viewing the interface, so the interface does not display video from the user who is viewing the interface, instead showing video content from other users who have joined the video exchange session to the user, with the user unable to view video content provided by the user to the video messaging module 235 via the interface shown to the user. In various embodiments, FIGS. 3A and 3B show example interfaces generated by the video messaging module 235 and displayed to users who have joined a video exchange session. For purposes of illustration, FIGS. 3A and 3B show interfaces presented to a viewing user 310 via a client device 110 of the viewing user. In the example shown by FIG. 3A, interface 300A includes regions 305A, 305B, 305C, 305D that each correspond to other users who have joined the video exchange session. Region 305A displays video content that the video messaging module 235 receives from a client device 110 of a first user, while region 305B displays video content that the video messaging module 235 receives from a client device 110 of a second user. Similarly, region 305C displays video content the video messaging module 235 receives from a client device 110 of a third user, and region 305D displays video content the video messaging module 235 receives from a client device 110 of a fourth user. Interface 300A also includes local region 310 that displays video content captured by the client device 110 of the viewing user and transmitted to the video messaging module 235, allowing the viewing user to view the video content that the client device 110 of the viewing user is transmitting to the video messaging module 235 via interface 300A. In contrast, FIG. 3B shows interface 300B, which includes regions 305A, 305B, 305C, 305D but does not include local region 310. Hence, interface 300B allows the viewing user to view video content that the video messaging module 235 receives from other users corresponding to regions 305A, 305B, 305C, 305D, but does not display video content captured by the client device 110 of the viewing user and transmitted to the video messaging module 235. In some embodiments, the viewing user may alter inclusion of local region 310 in interface 300A by modifying a setting maintained by the online system 140 for the user or maintained by an application executing on the client device 110 of the viewing user that displays interface 300A; hence, the viewing user may select display of interface 300A or interface 300B via the viewing user's client device 110 through one or more settings maintained for the viewing user by an application on the viewing user's client device 110 of by the online system 140.

In various embodiments, the video messaging module 235 allows a user participating in a video exchange session, such as the requesting user, to select external video content that is displayed to the users participating in the video exchange session in conjunction with video content received from the users participating in the video exchange session. The video messaging module 235 obtains the external video content from a source other than the users participating in the video exchange session. For example, the external video content is a stored video, such as a looped video, from the content store 210 of the online system 140 or obtained from a third party system 130. As another example, the external video content is video content that the video messaging module 235 receives from a third party system 130, such as video content streamed from the third party system 130. The video messaging module 235 generates an interface for a video exchange session including regions for displaying video content received from the users participating in the video exchange session and one or more external regions that display the external video content from a source other than the users participating in the video exchange session. By displaying the external video content along with the video content received from users participating in the video exchange session, the interface generated by the video messaging module 235 allows the external video content to include a common distraction to the users participating the in video exchange session, allowing the video exchange session to more closely emulate a real life meeting between the users.

Figure 4:
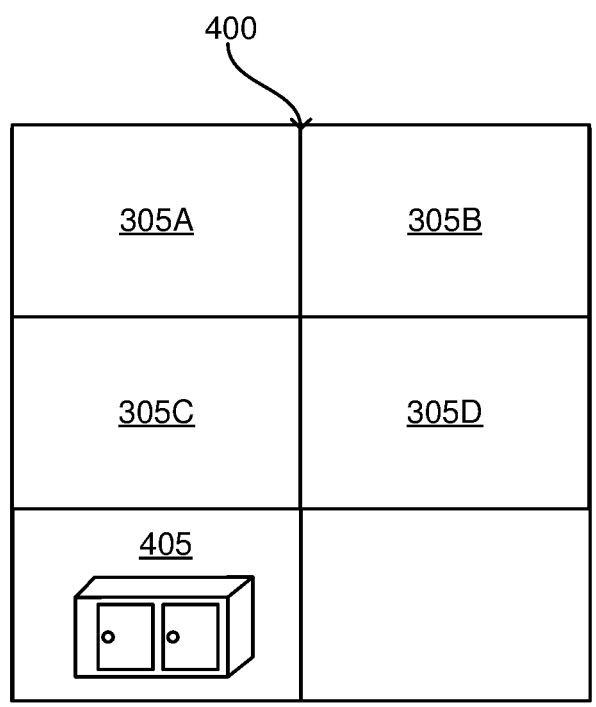
FIG. 4 is an example interface in which external video content from an external source is displayed along with video content from users participating in a video exchange session including multiple users of the online system, in accordance with an embodiment.

FIG. 4 shows an example interface 400 including an external region displaying video content obtained from a source other than users participating in a video exchange session. For purposes of illustration, the interface 400 shown by FIG. 4 includes regions 305A, 305B, 305C, 305D (individually or collectively referred to using reference number 305) that each correspond to other users who have joined the video exchange session. Region 305A displays video content that the video messaging module 235 receives from a client device 110 of a first user, while region 305B displays video content that the video messaging module 235 receives from a client device 110 of a second user. Similarly, region 305C displays video content the video messaging module 235 receives from a client device 110 of a third user, and region 305D displays video content the video messaging module 235 receives from a client device 110 of a fourth user. As further described above in conjunction with FIG. 3A, a region of the interface 400 may display video content the video messaging module 235 receives from a user viewing the interface 400.

In addition to regions 305A, 305B, 305C, 305D, interface 400 includes an external region 405 that displays external video content the video messaging module 235 obtains from a source other than a user participating in the video exchange session. The external region 405 may be displayed in a specific location of the interface 400 relative to regions 305A, 305B, 305C, 305D in various embodiments. While the interface 400 shown in FIG. 4 includes a single external region 405, the interface 400 may include any number of external regions 405 in various embodiments. For example, the interface 400 may allocate a specified number or percentage of regions 305 for displaying external video content obtained from a source other than users participating in the video exchange session. In some embodiments, the number of external regions 405 in the interface 400 is directly related (e.g., directly proportional) to a number of users participating in the video exchange session, allowing the interface to include more external regions 405 when more users participate in the video exchange session. Different external regions 405 in the interface 400 display external video content obtained form different external sources in various embodiments, allowing the interface 400 to display various external video content to users participating in the video exchange session. Inclusion of one or more external regions 405 for displaying video content from external sources other than users participating in the video exchange session is further described below in conjunction with FIG. 5.

Referring back to FIG. 2, the web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Figure 5:
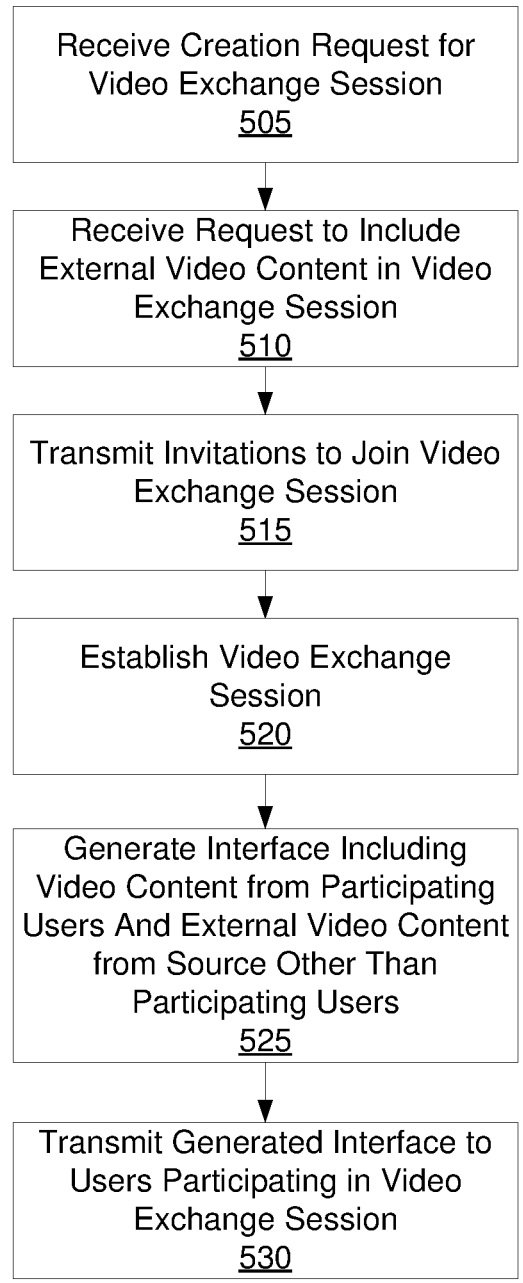
FIG. 5 is a flowchart of a method for method for displaying external video content from an external source along with video content from various users of an online system in a video exchange session, in accordance with an embodiment.

Displaying Video Content from a Source Other than Users Exchanging Video Content FIG. 5 is a flowchart of one embodiment of a method for displaying external video content from an external source along with video content from various users of an online system 140 in a video exchange session. In various embodiments, the method includes different or additional steps than those described in conjunction with FIG. 5. Further, in some embodiments, the steps of the method are performed in different orders than the order described in conjunction with FIG. 5.

An online system 140 receives 505 a creation request from a requesting user for a video exchange session to exchange video content where the requesting users and one or more other users exchange video content captured by their respective client devices 110. In various embodiments, the creation request identifies one or more other users to whom the online system 140 transmits invitations to join the video exchange session. For example, the creation request includes user identifiers of specific users provided by the requesting user, so the online system 140 transmits invitations to the specific users. As another example, the creation request includes a specific characteristic of users, so the online system 140 transmits an invitation to join the video exchange session to users having the specific characteristic; in an example, the creation request identifies a characteristic of a connection to the requesting user, so the online system 140 transmits an invitation to other users connected to the requesting user via the online system 140. Additionally, the creation request specifies whether a user other than the requesting user may invite additional users to the video exchange session. In one embodiment, the creation request includes a setting having a specific value when the requesting user authorizes other users in the video exchange session to invite additional users to join the video exchange session and having an alternative value when the requesting user prevents other users in the video exchange session to invite additional users to the video exchange session.

After receiving 505 the creation request, the online system 140 allows the creating user to specify an activity for the video exchange session. The activity identifies thematic content for the video exchange session in some embodiments. Example thematic content for the video exchange session include a name for the video exchange session, backgrounds from which video content received from a user participating in the video exchange session (e.g., video content captured by a user's client device 110) may be overlaid, one or more effects that users participating in the video exchange session may include in video content from the users, or other content for display or presentation to users participating in the video exchange session. The online system 140 maintains a set of activities for association with a video exchange session, with different activities having different thematic information for a video exchange session.

Additionally, the online system 140 receives 510 a request to include external video content in the video exchange session. For example, the online system 140 receives 510 the request from the creating user. The external video content is obtained from an external source that is different from the users participating in the video exchange session. For example, the external video content is obtained from content stored by the online system 140. As another example, the external video content is obtained from a third party system 130 having a domain different than a domain of the online system 140. In another example, the external video content is obtained from an alternative user of the online system 140. The external video content may be stored video content, such as video content that displays in a loop. Alternatively, the external video content is streaming video content obtained from a third party system 130 or form the online system 140. In some embodiments, thematic content identified by an activity for the video exchange session may identify external video content that is displayed along with video content from users participating in the video exchange session. In various embodiments, different activities specify different external sources of external video content. For example, an activity relating to sports may specify external sources including highlights of completed sporting events, including analysis of sporting events, or including video content streaming current sporting events. As another example, an activity relating to nature may specify external sources including stored video content of animals or including streaming video content of animal habitats. In various embodiments, an activity is associated with one or more external sources of external video content, and the request for external video content is a selection of an activity. Alternatively, the received request includes identifiers of external sources for external video content, allowing the user from whom the request was received 510 to specify the external sources for the external video content. Identifiers of external sources include a universal resource identifier (URI), a universal resource locator (URL), a network address, or any other information allowing the online system 140 to identify an external source from which external video content is obtained.

The online system 140 transmits 515 invitations to join the video exchange sessions to users identified by the creation request from the requesting user. In various embodiments, an invitation to join the video exchange session includes thematic information from the activity specified for the video exchange session. The invitation includes information identifying the video exchange session, and a link that, when accessed by a user via a client device 110, causes the client device 110 of the user to join the video exchange session. For example, the requesting user specifies a name of the video exchange session in the creation request to the online system 140, and the invitation transmitted 515 from the online system 140 to one or more other users identified by the creation request includes the name of the video exchange session. The invitations transmitted 515 from the online system 140 to the one or more other users may include other information, such as a description of the video exchange session or information identifying the requesting user.

In response to receiving acceptances of invitations from one or more users, the online system 140 establishes 520 the video exchange session between the requesting user and the one or more users from whom acceptances of invitations were received. In various embodiments, the online system 140 receives 510 the request to include external video content in the video exchange session from a user who joined the video exchange session. Hence, the request to include external video data in the video exchange session may be received 510 from the requesting user before the video exchange session is established 520 or before the invitations to join the video exchange session are transmitted 515 from the online system 140, in some embodiments. Alternatively, the online system 140 receives 510 the request to include external video data in the video exchange session after the online system 140 establishes 520 the video exchange session.

The online system 140 generates 525 the interface for the video exchange session associating each user participating in the video exchange with a region in the interface and allocating one or more regions in the interface as external regions in which external video is displayed. Hence, the interface inserts video content the online system 140 receives from a user participating in the video exchange session into a region associated with the user and inserts external video content obtained from a source other than users participating in the video exchange session into the one or more external regions. This allows the interface to display video content obtained from users participating in the video exchange session along with external video data obtained from one or more sources other than the users participating in the video exchange session, so the external video data provides a common distraction or common alternative content displayed to each of the users participating in the video exchange session. In various embodiments, the online system 140 modifies external video content received from an external source when inserting the external video data into an external region of the interface allocated for external video content. For example, the online system 140 crops external video data and inserts the cropped video data into an external region of the interface. As another example, the online system 140 resizes external video data and inserts the resized video data into an external region of the interface. However, in other embodiments, the online system 140 performs any suitable modification, or modifications, to the external video data received from a source other than users participating in the video exchange session and inserts the modified video data into an external region of the interface.

In some embodiments, a location of an external region within the interface is specified by a template corresponding to an activity specified by the request to include external video content in the video exchange session. For example, the template specifies specific locations (e.g., locations at boundaries of the interface, locations in corners of the interface, etc.) in which external regions are located, so external video content is displayed in specific locations within the interface. Different templates may be associated with different activities, so external content is displayed in different locations within the interface when different activities are specified for the video exchange session. Alternatively, the user from whom the request to include external video content in the video exchange session selects locations within the interface where external video content is displayed when the interface is generated 525 or in the request to include external video content in the video exchange session.

The interface may include multiple external regions in some embodiments. Different external sources may be allocated to different external regions, allowing the interface to display external video from multiple external sources in different external regions. Alternatively, external video content from a common external source is displayed in multiple external regions. In some embodiments, dimensions of the external region differ from dimensions of regions in which video content received from users participating in the video exchange session are displayed. For example, the external region has a reduced height and a reduced width relative to a height and a width of a region displaying video content received from a user participating in the video exchange session. Alternatively, the external region has dimensions matching dimensions of regions displaying video content received from users participating in the video exchange session. Dimensions of the external region may be specified by the template corresponding to an activity specified for the video exchange session or otherwise stored by the online system 140. Alternatively, dimensions of the external region are specified by the user requesting inclusion of external video content in the video exchange session.

The online system 140 transmits 530 the generated interface to client devices 110 of users participating in the video exchange session, with the client devices 110 displaying the interface so video content from each user participating in the video exchange session is shown in a region corresponding to the user and the external video content is displayed in the external region of the interface allocated to the external video content. As described above in conjunction with FIG. 3B, in some embodiments, the interface displays video content received from a user to whom the interface is displayed in the interface, while in other embodiments, the interface does not display video content received from the user to whom the interface is displayed via the user's client device 110.

The requesting user may identify certain users as authorized to request inclusion of external video content from one or more sources other than the users participating in the video exchange session in the creation request, and the online system 140 compares a user identifier included in the request to user identifiers of users who are authorized to request inclusion of external video content in the video exchange session. In response to the user identifier included in the request matching a user identifier of a user authorized to request inclusion of external video content in the video exchange session, the online system 140 generates 525 the interface including the external region displaying external video content as further described above. However, if the user identifier included in the request does not match a user identifier of a user authorized to request inclusion of external video content in the video exchange session, the online system 140 disregards the received request for inclusion of external video content in the video exchange session. Alternatively, the online system 140 authorizes the requesting user to request inclusion of external video content in the video exchange session while preventing other users from requesting inclusion of external video content in the video exchange session.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a creation request for establishing a video exchange session from a requesting user at an online system, the creation request identifying one or more other users to exchange video content with the requesting user;
receiving, at the online system, a request for an interface of the video exchange session to include external video content from an external source other than users participating in the video exchange session;

generating, by the online system, the interface of the video exchange session, the interface including regions associated with each user participating in the video exchange session, a region associated with a user displaying video content the online system receives from the user, and an external region in which external video content the online system receives from the source other than the users participating in the video exchange session is displayed; and transmitting the interface from the online system to client devices of one or more users participating in the video exchange session.

2. The method of claim 1, wherein receiving, at the online system, the request for the interface of the video exchange session to include external video content from the external source other than users participating in the video exchange session comprises:

receiving a selection of an activity for the video exchange session, the activity specifying one or more external sources other than the users participating in the video exchange session for the external video content.

3. The method of claim 2, wherein the online system stored multiple activities for the video exchange session, different activities specifying different external sources other than the users participating in the video exchange session for the external video content.

4. The method of claim 2, wherein the activity is associated with a template specifying a location within the interface for the external region.

5. The method of claim 1, wherein the external source comprises content stored by the online system.

6. The method of claim 5, wherein the content stored by the online system comprises video content that displays in a loop.

7. The method of claim 1, wherein the external source comprises a third party system.

8. The method of claim 7, wherein the content stored by the online system comprises video content that displays in a loop.

9. The method of claim 1, wherein the external source comprises an alternative user of the online system.

10. The method of claim 1, wherein receiving, at the online system, the request for the interface of the video exchange session to include external video content from the external source other than users participating in the video exchange session comprises:

receiving, at the online system, an identifier of the external source.

11. A computer program product comprising a non-transitory computer-readable storage medium having instructions encoded thereon that, when executed by a processor, cause the processor to:

receive a creation request for establishing a video exchange session from a requesting user at an online system, the creation request identifying one or more other users to exchange video content with the requesting user;

receive, at the online system, a request for an interface of the video exchange session to include external video content from an external source other than users participating in the video exchange session;

generate, by the online system, the interface of the video exchange session, the interface including regions associated with each user participating in the video exchange session, a region associated with a user displaying video content the online system receives from the user, and an external region in which external video content the online system receives from the source other than the users participating in the video exchange session is displayed; and transmit the interface from the online system to client devices of one or more users participating in the video exchange session.

12. The computer program product of claim 11, wherein receive, at the online system, the request for the interface of the video exchange session to include external video content from the external source other than users participating in the video exchange session comprises:

receive a selection of an activity for the video exchange session, the activity specifying one or more external sources other than the users participating in the video exchange session for the external video content.

13. The computer program product of claim 12, wherein the online system stored multiple activities for the video exchange session, different activities specifying different external sources other than the users participating in the video exchange session for the external video content.

14. The computer program product of claim 12, wherein the activity is associated with a template specifying a location within the interface for the external region.

15. The computer program product of claim 11, wherein the external source comprises content stored by the online system.

16. The computer program product of claim 15, wherein the content stored by the online system comprises video content that displays in a loop.

17. The computer program product of claim 11, wherein the external source comprises a third party system.

18. The computer program product of claim 17, wherein the content stored by the online system comprises video content that displays in a loop.

19. The computer program product of claim 11, wherein the external source comprises an alternative user of the online system.

20. The computer program product of claim 11, wherein receive, at the online system, the request for the interface of the video exchange session to include external video content from the external source other than users participating in the video exchange session comprises:

receive, at the online system, an identifier of the external source.

* * * * *